United States Patent
Liao

(10) Patent No.: US 12,057,725 B2
(45) Date of Patent: Aug. 6, 2024

(54) CHARGING CONTROL CIRCUIT, TERMINAL DEVICE, CONTROL METHOD AND COMPUTER-READABLE STORAGE MEDIUM

(71) Applicant: VIVO MOBILE COMMUNICATION CO., LTD., Guangdong (CN)

(72) Inventor: Xingbao Liao, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 424 days.

(21) Appl. No.: 17/407,303

(22) Filed: Aug. 20, 2021

(65) Prior Publication Data
US 2021/0384749 A1    Dec. 9, 2021

Related U.S. Application Data

(63) Continuation of application No. PCT/CN2020/073201, filed on Jan. 20, 2020.

(30) Foreign Application Priority Data

Feb. 22, 2019   (CN) .......................... 201910133245.4

(51) Int. Cl.
| | | |
|---|---|---|
| H01M 10/44 | (2006.01) | |
| H01M 10/46 | (2006.01) | |
| H02J 7/00 | (2006.01) | |
| H02J 50/10 | (2016.01) | |

(52) U.S. Cl.
CPC .......... H02J 7/0068 (2013.01); H02J 7/0071 (2020.01); *H02J 50/10* (2016.02)

(58) Field of Classification Search
CPC ........ H02J 7/0068; H02J 7/0071; H02J 50/10; H02J 7/007; H02J 7/007194
USPC .......................... 320/107, 114, 125, 138, 150
See application file for complete search history.

(56) References Cited

U.S. PATENT DOCUMENTS

| | | | |
|---|---|---|---|
| 9,350,183 B2 * | 5/2016 | Park .......................... | H02J 7/00 |
| 9,583,970 B2 | 2/2017 | Hsia et al. | |
| 2012/0161697 A1 | 6/2012 | Park et al. | |

(Continued)

FOREIGN PATENT DOCUMENTS

| | | |
|---|---|---|
| CN | 206117963 U | 4/2017 |
| CN | 106654424 A | 5/2017 |
| CN | 108879841 A | 11/2018 |

(Continued)

*Primary Examiner* — Edward Tso
(74) *Attorney, Agent, or Firm* — Price Heneveld, LLP

(57) ABSTRACT

A charging control circuit, a terminal device, and a control method are disclosed. The charging control circuit includes a first charging sub-circuit (1) and a second charging sub-circuit (2), a charging efficiency of the first charging sub-circuit being higher than a charging efficiency of the second charging sub-circuit. The charging control circuit further includes a switch circuit (3), where a first contact of the switch circuit is connected to a charging port (4), a second contact of the switch circuit is connected to an output terminal of a wireless charging module (5), and a third contact of the switch circuit is connected to an input terminal of the first charging sub-circuit; and in a case of a wireless charging operation, the first contact and the third contact disconnect from each other and the second contact and the third contact conductively connect to each other.

20 Claims, 3 Drawing Sheets

(56) References Cited

U.S. PATENT DOCUMENTS

2018/0131216 A1 5/2018 Estes et al.

FOREIGN PATENT DOCUMENTS

| CN | 109672254 A | 4/2019 |
|---|---|---|
| EP | 3343727 A1 | 12/2016 |
| KR | 101727495 B1 | 5/2017 |

* cited by examiner

CHARGING CONTROL CIRCUIT, TERMINAL DEVICE, CONTROL METHOD AND COMPUTER-READABLE STORAGE MEDIUM

CROSS-REFERENCE TO RELATED APPLICATIONS

This application is a continuation application of a PCT Application No. PCT/CN2020/073201 filed on Jan. 20, 2020, which claims priority to Chinese Patent Application No. 201910133245.4 filed in China on Feb. 22, 2019, which is incorporated herein by reference in its entirety.

TECHNICAL FIELD

This disclosure relates to the field of communications technologies, and in particular, to a charging control circuit, a terminal device, and a control method.

BACKGROUND

With the rapid development of terminal technologies, terminal devices have become an indispensable tool in people's life, bringing great convenience to users' life in all aspects. As wireless charging technologies develop, wireless charging is becoming an increasingly popular function employed by terminal devices. The principle of wireless charging is the transfer of energy between a charger and a terminal device via a magnetic field without any electrical wire connected in between. With such ease of use, wireless charging is highly popular among users.

In relevant arts, however, the efficiency of charging a terminal device wirelessly is quite low.

SUMMARY

Embodiments of this disclosure provide a charging control circuit, a terminal device, and a control method.

To resolve the foregoing technical problem, this disclosure is implemented as follows.

According to a first aspect, an embodiment of this disclosure provides a charging control circuit, where the charging control circuit includes a first charging sub-circuit and a second charging sub-circuit, a charging efficiency of the first charging sub-circuit being higher than a charging efficiency of the second charging sub-circuit, and the charging control circuit further includes a switch circuit, where a first contact of the switch circuit is connected to a charging port, a second contact of the switch circuit is connected to an output terminal of a wireless charging module, and a third contact of the switch circuit is connected to an input terminal of the first charging sub-circuit; and in a case of a wireless charging operation, the first contact and the third contact disconnect from each other and the second contact and the third contact conductively connect to each other.

According to a second aspect, an embodiment of this disclosure further provides a terminal device that includes the foregoing charging control circuit.

According to a third aspect, an embodiment of this disclosure further provides a control method, applied to the foregoing terminal device. The method includes:

controlling, in a case of a wireless charging operation, the first contact and third contact of the switch circuit to disconnect from each other and the second contact and third contact of the switch circuit to conductively connect to each other.

According to a fourth aspect, an embodiment of this disclosure further provides a terminal device, including a processor, a memory, and a computer program stored in the memory and capable of being run on the processor, where when the computer program is executed by the processor, the foregoing control method are implemented.

According to a fifth aspect, an embodiment of this disclosure further provides a computer-readable storage medium, where the computer-readable storage medium stores a computer program, and when the computer program is executed by a processor, the foregoing control method are implemented.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some of the embodiments of this disclosure, and a person of ordinary skill in the art may still derive other drawings from these accompanying drawings without creative efforts.

DESCRIPTION OF EMBODIMENTS

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure without creative efforts shall fall within the protection scope of this disclosure.

Figure 1:
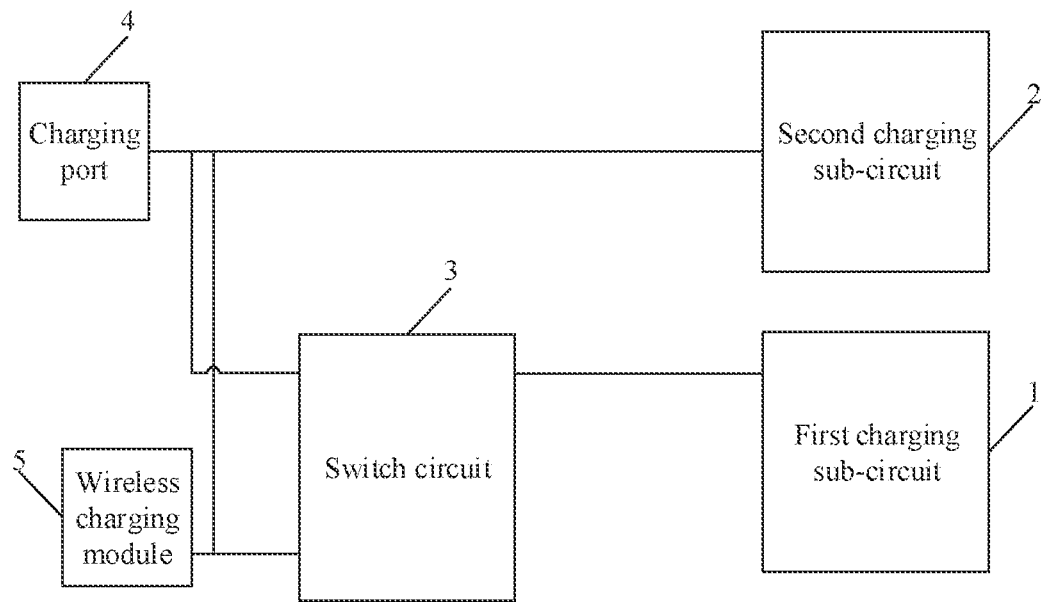
FIG. 1 is a first structural diagram of a charging control circuit according to an embodiment of this disclosure.

Refer to FIG. 1, which is a structural diagram of a charging control circuit according to an embodiment of this disclosure. As shown in FIG. 1, the charging control circuit includes a first charging sub-circuit 1 and a second charging sub-circuit 2, the charging efficiency of the first charging sub-circuit 1 being higher than the charging efficiency of the second charging sub-circuit 2, and the charging control circuit further includes a switch circuit 3, where a first contact of the switch circuit 3 is connected to a charging port 4, a second contact of the switch circuit 3 is connected to an output terminal of a wireless charging module 5, and a third contact of the switch circuit 3 is connected to an input terminal of the first charging sub-circuit 1; and in a case of a wireless charging operation, the first contact and the third contact disconnect from each other and the second contact and the third contact conductively connect to each other.

In this embodiment, the first charging sub-circuit 1 may be a fast charging circuit, and the second charging sub-circuit 2 may be a charging power management integrated circuit (Power Management IC, PMIC). Since the first contact and the third contact disconnect from each other and the second contact and the third contact conductively connect to each other in the case of a wireless charging operation, the first charging sub-circuit 1 with higher charging efficiency of the terminal device is used for the wireless charging, thus improving the efficiency of charging a terminal device wirelessly.

In this embodiment, during a wireless charging operation using the first charging sub-circuit 1, the wireless charging module 5 can output a high voltage, allowing smaller loss of an entire charging system in charging the terminal device wirelessly. This can increase the charging speed of the terminal device and reduce the temperature rise in charging, providing better user experience. In addition, when a wired charger is connected, the charging mode can automatically switch to wired charging, which allows higher charging speed.

Figure 2:
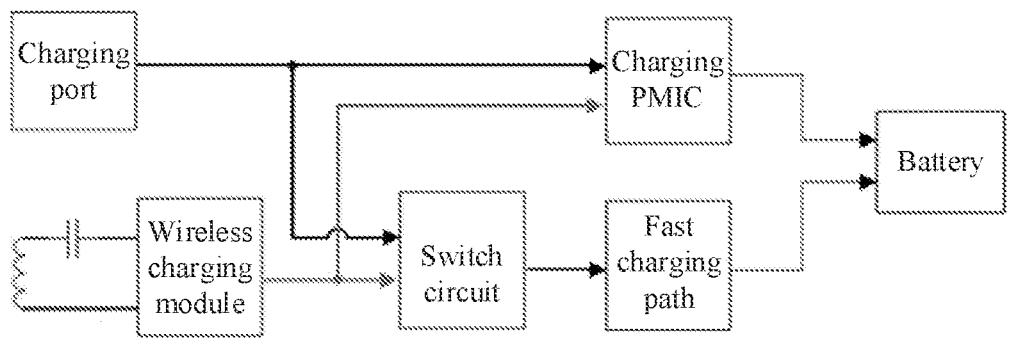
FIG. 2 is a functional block diagram of a charging system according to an embodiment of this disclosure.

Refer to FIG. 2, which is a functional block diagram of a charging system according to an embodiment of this disclosure. In FIG. 2, a wired charging circuit (in the case of constant-current charging) includes a charging port, a switch circuit, a fast charging circuit, and a battery in order. A wired charging circuit (in the case of trickle charging, constant-voltage charging, and charging cutoff) includes the charging port, a charging PMIC, and the battery in order. A wireless charging circuit (in the case of constant-current charging) includes an inductor and capacitor, a wireless charging module, the switch circuit, the fast charging circuit, and the battery in order. A wireless charging circuit (in the case of trickle charging, constant-voltage charging, and charging cutoff) includes the inductor and capacitor, the wireless charging module, the charging PMIC, and the battery in order. Wherein Trickle charging, constant-current charging, constant-voltage charging, and charging cutoff are four charging stages of (lithium-ion or lithium polymer) batteries. The charging PMIC and fast charging circuit are wired charging circuits of a charger, which are shared with wireless charging. During wireless charging, if a charger is connected to the charging port, the charging circuit automatically switches to a wired charging circuit.

Optionally, the switch circuit 3 includes a first sub-circuit and a second sub-circuit;
a first terminal of the first sub-circuit is connected to the first contact, and a second terminal of the first sub-circuit is connected to the third contact;
a first terminal of the second sub-circuit is connected to the second contact, and a second terminal of the second sub-circuit is connected to the third contact; and
in the case of a wireless charging operation, the first sub-circuit is disconnected and the second sub-circuit is conductive.

In this implementation, the first sub-circuit and the second sub-circuit may be formed, for example, by a transistor, or by a diode and a transistor together, or by a MOS transistor and a diode, which is not limited in this embodiment.

In this implementation, in the case of a wireless charging operation, the first sub-circuit is disconnected and the second sub-circuit is conductive. Thus, the first charging sub-circuit that has higher charging efficiency can be used for charging, improving the efficiency of charging a terminal device wirelessly.

Optionally, the first sub-circuit includes a first NMOS transistor, a second NMOS transistor, a first diode, and a second diode;
a drain of the first NMOS transistor is connected to the first contact, and a source of the first NMOS transistor is connected to a source of the second NMOS transistor;
a drain of the second NMOS transistor is connected to the third contact;
an anode of the first diode is connected to the source of the first NMOS transistor, and a cathode of the first diode is connected to the drain of the first NMOS transistor;
an anode of the second diode is connected to the source of the second NMOS transistor, and a cathode of the second diode is connected to the drain of the second NMOS transistor; and
a gate of the first NMOS transistor and a gate of the second NMOS transistor are both connected to a first control terminal.

In this implementation, the first control terminal may be a control terminal inside the switch circuit 3 or a control terminal outside the switch circuit 3, which is not limited in this embodiment. As the first sub-circuit includes the first NMOS transistor and the second NMOS transistor, and the gate of the first NMOS transistor and the gate of the second NMOS transistor are both connected to the first control terminal, only one signal is required to control both the first NMOS transistor and the second NMOS transistor to be on or off, making it easier to control the circuit.

For example, when the first control terminal sends a first signal, the first NMOS transistor and the second NMOS transistor may be turned on, and when the first control terminal sends a second signal, the first NMOS transistor and the second NMOS transistor may be turned off, thus facilitating the ease of control. In the case of a wireless charging operation, the first control terminal sends the second signal, and the first NMOS transistor and the second NMOS transistor are both off, so that the second sub-circuit is not affected. In addition, the second sub-circuit may be turned on so that the first charging sub-circuit that has higher charging efficiency is used for charging, improving the efficiency of charging a terminal device wirelessly.

Optionally, the second sub-circuit includes a third NMOS transistor, a fourth NMOS transistor, a third diode, and a fourth diode;
a drain of the third NMOS transistor is connected to the second contact, and a source of the third NMOS transistor is connected to a source of the fourth NMOS transistor;
a drain of the fourth NMOS transistor is connected to the third contact;
an anode of the third diode is connected to the source of the third NMOS transistor, and a cathode of the third diode is connected to the drain of the third NMOS transistor;
an anode of the fourth diode is connected to the source of the fourth NMOS transistor, and a cathode of the fourth diode is connected to the drain of the fourth NMOS transistor; and
a gate of the third NMOS transistor and a gate of the fourth NMOS transistor are both connected to a second control terminal.

In this implementation, the second control terminal may be a control terminal inside the switch circuit 3 or a control terminal outside the switch circuit 3, which is not limited in this embodiment. As the second sub-circuit includes the third NMOS transistor and the fourth NMOS transistor, and the gate of the third NMOS transistor and the gate of the fourth NMOS transistor are both connected to the second control terminal, only one signal is required to control both the third NMOS transistor and the fourth NMOS transistor to be on or off, making it easier to control the circuit.

For example, when the second control terminal sends a third signal, the third NMOS transistor and the fourth NMOS transistor may be turned on, and when the second control sends a fourth signal, the third NMOS transistor and the fourth NMOS transistor may be turned off, thus facilitating the ease of control. In the case of a wireless charging operation, the second control terminal sends the third signal and the third NMOS transistor and the fourth NMOS transistor are both on, so that the first charging sub-circuit that has higher charging efficiency is used for charging, improving the efficiency of charging a terminal device wirelessly. In addition, the first sub-circuit may be turned off in this case, avoiding impact of the first sub-circuit on the second sub-circuit.

Figure 3:
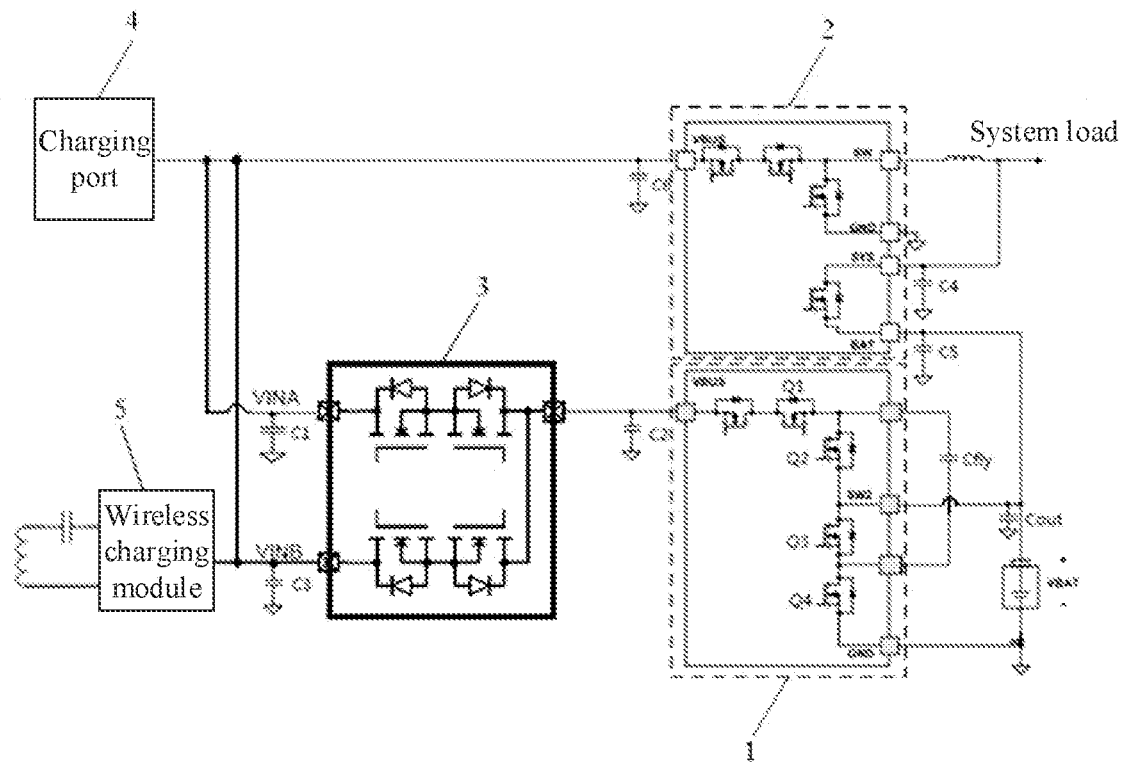
FIG. 3 is a second structural diagram of a charging control circuit according to an embodiment of this disclosure.
Figure 4:
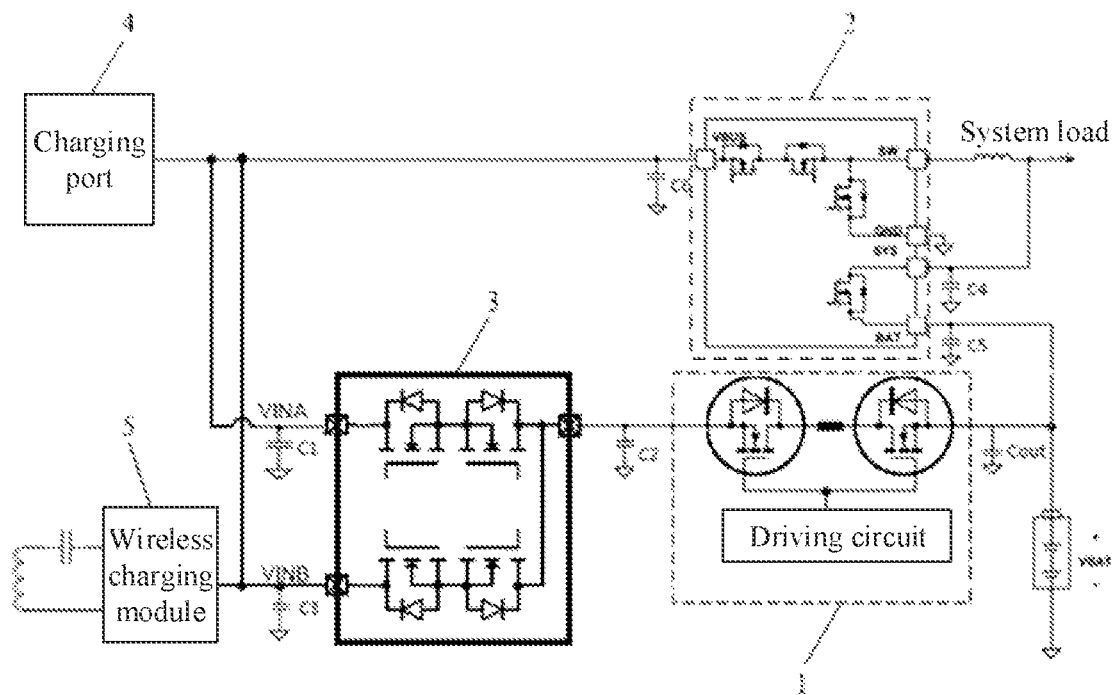
FIG. 4 is a third structural diagram of a charging control circuit according to an embodiment of this disclosure.

To better understand structures of the first sub-circuit, the second sub-circuit, and the entire charging control circuit, refer to FIG. 3 and FIG. 4, which are both structural diagrams of the charging control circuit provided in the embodiments of this disclosure.

First, as shown in FIG. 3, the first charging sub-circuit 1 is a charging PMIC, and the second charging sub-circuit 2 is a fast charging circuit. The wireless charging module 5 integrates the circuit of a rectifier module which receives an alternate current signal from a transmitter and rectifies the alternate current signal to a direct current output voltage VINB that serves as an input voltage of the charging chip (charging PMIC or fast charging circuit). The wireless charging module 5 integrates circuits of two communication modules, which are an amplitude shift keying (ASK) communication module and a frequency shift keying (FSK) communication module. The ASK communication module is responsible for modulating a communication signal of a receiver into a carrier signal, and sends the carrier signal to a transmitter device; the FSK communication module is responsible for receiving a communication signal sent from the transmitter and communicating with the system after demodulating that communication signal. The wireless charging module 5 also integrates circuits of protection mechanism modules (overvoltage and temperature) and others.

The switch circuit 3 provides a low-impedance path for charging. The VINB path is used by default, and when a charger is connected to the charging port, a VINA path takes over automatically.

As shown in FIG. 3, the fast charging circuit is a half-voltage circuit. Internally, a single half-voltage device typically incorporates four NMOS transistors to function as its switch, which are Q1, Q3, Q2, and Q4 shown in FIG. 3, and capacitor Cfly and capacitor Cout are connected in parallel. An input voltage is Vbus, an battery output voltage is VBAT, and a voltage across two terminals of the capacitor Cfly is Vcfly. When the circuit is working, on/off states of the transistors are controlled so as to charge or discharge the capacitor Cfly. The duty cycle of the switch is controlled to be 50%, making Vout=Vin/2, so that voltage is halved and current is doubled.

The charging PMIC is a high-efficiency charging IC which controls and manages charging parameters of the battery. VBAT is a pack of lithium-ion battery cells or a lithium polymer battery pack.

refer to FIG. 4, where the first charging sub-circuit 1 is a charging PMIC, and the second charging sub-circuit 2 is a fast charging circuit. FIG. 4 is different from FIG. 3 in that the fast charging circuit is a direct charging equivalent circuit, where a direct charging switch used is typically implemented by two discrete N MOSFETs or an integrated IC (similar to discrete N MOSFETs). When the switch is on, a charger charges the battery VBAT directly.

The charging control circuit in the embodiments of this disclosure includes the first charging sub-circuit 1 and the second charging sub-circuit 2, the charging efficiency of the first charging sub-circuit 1 being higher than the charging efficiency of the second charging sub-circuit 2, and the charging control circuit further includes the switch circuit 3; the first contact of the switch circuit 3 is connected to the charging port 4, the second contact of the switch circuit 3 is connected to the output terminal of the wireless charging module 5, and the third contact of the switch circuit 3 is connected to the input terminal of the first charging sub-circuit 1; and in a case of a wireless charging operation, the first contact and the third contact disconnect from each other and the second contact and the third contact conductively connect to each other. Thus, the first charging sub-circuit that has higher charging efficiency can be used for charging in the case of a wireless charging operation, improving the efficiency of charging a terminal device wirelessly.

An embodiment of this disclosure further provides a terminal device that includes the foregoing charging control circuit.

In this embodiment, the terminal device may be a mobile phone, a tablet personal computer, a laptop computer, a personal digital assistant (PDA), a mobile internet device (MID), a wearable device, or the like.

Figure 5:
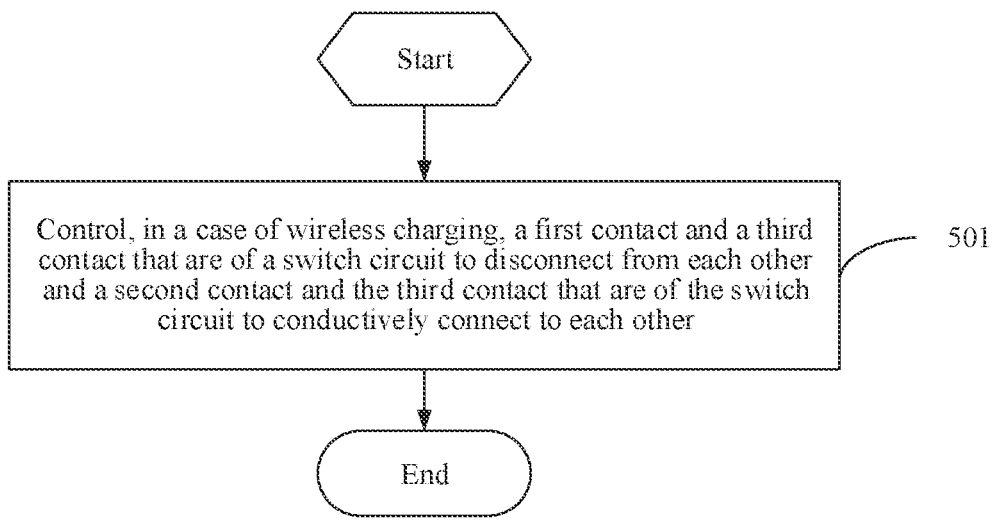
FIG. 5 is a flowchart of a control method according to an embodiment of this disclosure.

FIG. 5 is a flowchart of a control method according to an embodiment of this disclosure, where the method is applied to the foregoing terminal device. As shown in FIG. 5, the control method includes the following steps.

Step 501. Control, in a case of a wireless charging operation, the first contact and third contact of the switch circuit to disconnect from each other and the second contact and third contact of the switch circuit to conductively connect to each other.

In this embodiment, in the case of a wireless charging operation, the first contact and third contact of the switch circuit are controlled to disconnect from each other and the second contact and third contact of the switch circuit are controlled to conductively connect to each other. Thus, the first charging sub-circuit that has higher charging efficiency can be used for charging, improving the efficiency of charging the terminal device wirelessly.

Optionally, the controlling the first contact and third contact of the switch circuit to disconnect from each other and the second contact and third contact of the switch circuit to conductively connect to each other includes:

in a case that a battery voltage is higher than a predetermined threshold voltage or that a battery temperature is lower than a predetermined threshold temperature, controlling the first contact and third contact of the switch circuit to disconnect from each other and the second contact and third contact of the switch circuit to conductively connect to each other.

In this implementation, in the case that the battery voltage is higher than the predetermined threshold voltage or that the battery temperature is lower than the predetermined threshold temperature, the first contact and third contact of the switch circuit are controlled to disconnect from each other and the second contact and third contact of the switch circuit are controlled to conductively connect to each other. Thus, a finer control process is possible by using the battery voltage or battery temperature as a judgment criterion.

Optionally, the method further includes:

in a case that the battery voltage is lower than or equal to the predetermined threshold voltage and that the battery temperature is higher than or equal to the predetermined threshold temperature, performing wireless charging by using the second charging sub-circuit.

In this implementation, the case that the battery voltage is lower than or equal to the predetermined threshold voltage and that the battery temperature is higher than or equal to the predetermined threshold temperature does not conform to a fast charging condition, in this case, the second charging sub-circuit can be used for wireless charging, where the second charging sub-circuit may be a charging PMIC. Thus, the wireless charging process is safer.

Optionally, before the controlling, in a case of a wireless charging operation, the first contact and third contact of the switch circuit to disconnect from each other and the second contact and third contact of the switch circuit to conductively connect to each other, the method further includes:

sending a high-voltage charging request to a charger; and
the controlling, in a case of a wireless charging operation, the first contact and third contact of the switch circuit to disconnect from each other and the second contact and third contact of the switch circuit to conductively connect to each other includes:
in a case of a wireless charging operation and successful request, controlling the first contact and third contact of the switch circuit to disconnect from each other and the second contact and third contact of the switch circuit to conductively connect to each other.

In this implementation, the charger is a wireless charger, and the high-voltage charging request may contain a requested high-voltage range. In the case of a wireless charging operation and successful request, the first contact and third contact of the switch circuit are controlled to disconnect from each other and the second contact and third contact of the switch circuit are controlled to conductively connect to each other. Successful request means that the wireless charger is able to provide a high voltage, in which case the first charging sub-circuit that has higher charging efficiency can be used for charging, improving the efficiency of charging the terminal device wirelessly.

Optionally, after the sending a high-voltage charging request to a charger, the method further includes:

in a case of a wireless charging operation and unsuccessful request, performing wireless charging by using the second charging sub-circuit.

In this implementation, in the case of a wireless charging operation and unsuccessful request, the second charging sub-circuit is used for wireless charging. In this case, the wireless charger may not be able to output a high voltage in the requested range, and the charging PMIC may be used for charging.

Optionally, after the controlling, in a case of a wireless charging operation, the first contact and third contact of the switch circuit to disconnect from each other and the second contact and third contact of the switch circuit to conductively connect to each other, the method further includes:

in a case that a wired charger is connected, controlling the first contact and third contact of the switch circuit to conductively connect to each other and the second contact and third contact of the switch circuit to disconnect from each other.

In this implementation, in the case that a wireless charger is connected, the first contact and third contact of the switch circuit are controlled to conductively connect to each other and the second contact and third contact of the switch circuit are controlled to disconnect from each other. The charging mode automatically switches to wired charging, which allows higher charging speed and less temperature rise.

It should be noted that the foregoing implementations may be implemented separately or in combination with each other, which is not limited in the embodiments of this disclosure. For example, charging is not performed in a case of unsuccessful handshake between the terminal device and the wireless charger. In a case of successful handshake between the terminal device and the wireless charger, if a fast charging condition (constant-current charging stage of the battery, for example, when the battery voltage Vbat is higher than a predetermined value V1 or when the battery temperature T is lower than a predetermined value t1) is satisfied, a high-voltage mode is requested of the charger for wireless charging. After the charger outputs a high voltage, the terminal device uses the fast charging circuit for charging. If the fast charging condition (trickle charging or constant-voltage charging stage of the battery) is not satisfied, the charger is unable to output a high voltage in the requested range, and the charging PMIC path is used for charging.

According to the control method in the embodiments of this disclosure, in the case of a wireless charging operation, the first contact and third contact of the switch circuit are controlled to disconnect from each other and the second contact and third contact of the switch circuit are controlled to conductively connect to each other. Thus, the first charging sub-circuit that has higher charging efficiency can be used for charging in the case of a wireless charging operation, improving the efficiency of charging the terminal device wirelessly.

Figure 6:
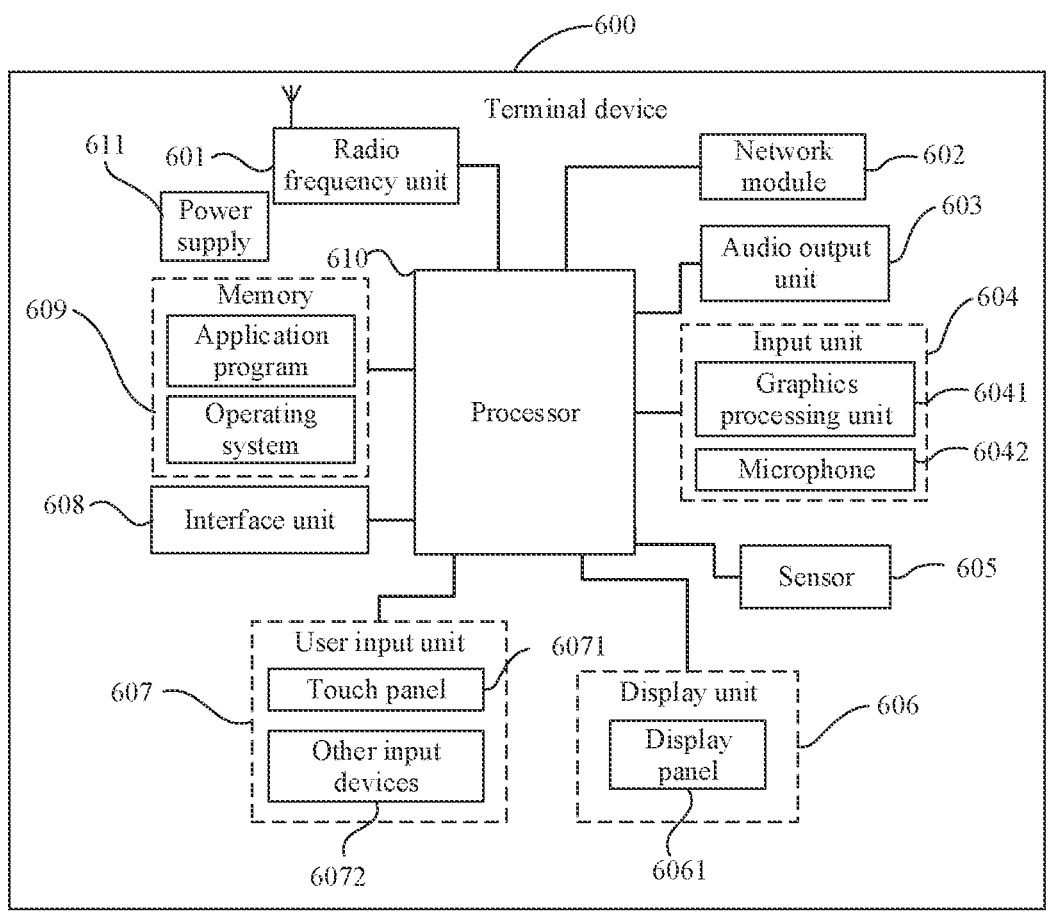
FIG. 6 is a structural diagram of a terminal device according to an embodiment of this disclosure.

Referring to FIG. 6, FIG. 6 is a schematic diagram of a hardware structure of a terminal device that implements the embodiments of this disclosure. The terminal device 600 includes but is not limited to components such as a radio frequency unit 601, a network module 602, an audio output unit 603, an input unit 604, a sensor 605, a display unit 606, a user input unit 607, an interface unit 608, a memory 609, a processor 610, and a power supply 611. A person skilled in the art may understand that the structure of the terminal device shown in FIG. 6 does not constitute any limitation on the terminal device. The terminal device may include more or fewer components than shown in the figure, or have some of the components combined or have the components arranged differently. In this embodiment of this disclosure, the terminal device includes but is not limited to a mobile phone, a tablet computer, a laptop computer, a palmtop computer, an in-vehicle terminal, a wearable device, a pedometer, and the like.

The processor 610 may be configured to control, in a case of a wireless charging operation, a first contact and a third contact that are of a switch circuit to disconnect from each other and a second contact and the third contact that are of the switch circuit to conductively connect to each other. Thus, a first charging sub-circuit that has higher charging efficiency can be used for charging in the case of a wireless charging operation, improving the efficiency of charging the terminal device wirelessly.

Optionally, the processor 610 is further configured to, in a case that a battery voltage is higher than a predetermined threshold voltage or that a battery temperature is lower than a predetermined threshold temperature, control the first contact and third contact of the switch circuit to disconnect from each other and the second contact and third contact of the switch circuit to conductively connect to each other.

Optionally, the processor 610 is further configured to, in a case that the battery voltage is lower than or equal to the predetermined threshold voltage and that the battery temperature is higher than or equal to the predetermined threshold temperature, control wireless charging to be performed by using the second charging sub-circuit.

Optionally, the processor 610 is further configured to send a high-voltage charging request to a charger; and in a case of a wireless charging operation and successful request, control the first contact and third contact of the switch circuit to disconnect from each other and the second contact and third contact of the switch circuit to conductively connect to each other.

Optionally, the processor 610 is further configured to, in a case of a wireless charging operation and unsuccessful request, control wireless charging to be performed by using the second charging sub-circuit.

Optionally, the processor 610 is further configured to, in a case that a wired charger is connected, control the first contact and third contact of the switch circuit to conductively connect to each other and the second contact and third contact of the switch circuit to disconnect from each other.

It should be understood that in this embodiment of this disclosure, the radio frequency unit 601 may be configured to receive/send information, or to receive/send a signal in a call process, and specifically, after receiving downlink data from a base station, send the downlink data to the processor 610 for processing; and send uplink data to the base station. Generally, the radio frequency unit 601 includes but is not limited to an antenna, at least one amplifier, a transceiver, a coupler, a low noise amplifier, a duplexer, and the like. In addition, the radio frequency unit 601 may further communicate with a network and another device through a wireless communications system.

The terminal device provides wireless broadband internet access for a user by using the network module 602, for example, helps the user send and receive e-mails, browse web pages, or access streaming media.

The audio output unit 603 may convert audio data received by the radio frequency unit 601 or the network module 602 or stored in the memory 609 into an audio signal and output the audio signal as a sound. In addition, the audio output unit 603 may further provide an audio output (for example, a call signal received sound or a message received sound) related to a specific function performed by the terminal device 600. The audio output unit 603 includes a speaker, a buzzer, a telephone receiver, and the like.

The input unit 604 is configured to receive an audio or video signal. The input unit 604 may include a graphics processing unit (GPU) 6041 and a microphone 6042, and the graphics processing unit 6041 processes image data of a still picture or a video obtained by an image capture apparatus (for example, a camera) in an image capture mode or a video capture mode. A processed image frame may be displayed on the display unit 606. An image frame processed by the graphics processing unit 6041 may be stored in the memory 609 (or other storage media) or sent by the radio frequency unit 601 or the network module 602. The microphone 6042 can receive a sound and can process the sound into audio data. The processed audio data can be converted into a format that can be sent to a mobile communication base station through the radio frequency unit 601 in a telephone call mode, for outputting.

The terminal device 600 further includes at least one sensor 605, for example, an optical sensor, a motion sensor, and other sensors. Specifically, the optical sensor includes an ambient light sensor and a proximity sensor. The ambient light sensor may adjust luminance of a display panel 6061 based on brightness of ambient light. The proximity sensor may turn off backlight and/or the display panel 6061 when the terminal device 600 moves to an ear. As a type of motion sensor, an accelerometer sensor can detect magnitudes of accelerations in all directions (typically three axes), can detect the magnitude and direction of gravity when the mobile phone is in a static state, and can be applied to mobile phone posture recognition (such as screen switching between portrait and landscape, related games, and magnetometer posture calibration), functions related to vibration recognition (such as pedometer and tapping), and the like. The sensor 605 may also include a fingerprint sensor, a pressure sensor, an iris sensor, a molecular sensor, a gyroscope, a barometer, a hygrometer, a thermometer, an infrared sensor, and the like. Details are not described herein.

The display unit 606 is configured to display information input by the user or information provided for the user. The display unit 606 may include a display panel 6061, and the display panel 6061 may be configured in the form of a liquid crystal display (LCD), an organic light-emitting diode (OLED), or the like.

The user input unit 607 may be configured to receive input digit or character information, and generate a key signal input related to user setting and function control of the terminal device. Specifically, the user input unit 607 includes a touch panel 6071 and other input devices 6072. The touch panel 6071, also referred to as a touchscreen, may capture a touch operation performed by a user on or near the touch panel (for example, an operation performed by the user on the touch panel 6071 or near the touch panel 6071 by using any appropriate object or accessory such as a finger or a stylus). The touch panel 6071 may include two parts: a touch detection apparatus and a touch controller. The touch detection apparatus detects a touch direction of the user, detects a signal brought by a touch operation, and transmits the signal to the touch controller. The touch controller receives touch information from the touch detection apparatus, converts the touch information to touchpoint coordinates, and sends the touchpoint coordinates to the processor 610, and receives and executes a command sent by the processor 610. In addition, the touch panel 6071 may be implemented in a plurality of forms, for example, as a resistive, capacitive, infrared, or surface acoustic wave touch panel. The user input unit 607 may further include other input devices 6072 in addition to the touch panel 6071. Specifically, the other input devices 6072 may include but are not limited to a physical keyboard, a function key (such as a volume control key or a power on/off key), a trackball, a mouse, a joystick, and the like. Details are not described herein.

Further, the touch panel 6071 may cover the display panel 6061. After detecting a touch operation on or near the touch panel 6071, the touch panel 6071 transmits information about the touch operation to the processor 610 for the processor 610 to determine a type of the touch event, and then the processor 610 provides a corresponding visual output on the display panel 6061 based on the type of the touch event. Although the touch panel 6071 and the display panel 6061 are used as two independent components to implement input and output functions of the terminal device in FIG. 6, the touch panel 6071 and the display panel 6061 may be integrated to implement the input and output functions of the terminal device in some embodiments. This is not specifically limited herein.

The interface unit 608 is an interface for connecting an external apparatus to the terminal device 600. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 608 may be configured to receive an input (for example, data information or power) from the external apparatus, and transmit the received input to one or more components in the terminal device 600, or may be configured to transmit data between the terminal device 600 and the external apparatus.

The memory 609 may be configured to store software programs and various data. The memory 609 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 609 may include a high-speed random access memory, and may further include a non-volatile memory, for example, at least one magnetic disk storage device, a flash memory device, or other volatile solid-state storage devices.

The processor 610 is a control center of the terminal device. The processor 610 uses various interfaces and lines to connect all parts of the entire terminal device, and performs various functions and data processing of the terminal device by running or executing the software programs and/or modules stored in the memory 609 and calling the data stored in the memory 609, thereby performing overall monitoring on the terminal device. The processor 610 may include one or more processing units. Preferably, the processor 610 may integrate an application processor and a modem processor. The application processor mainly processes the operating system, a user interface, an application program, and the like. The modem processor mainly processes wireless communication. It may be understood that the modem processor may alternatively not be integrated into the processor 610.

The terminal device 600 may further include the power supply 611 (such as a battery) that supplies power to the components. Preferably, the power supply 611 may be logically connected to the processor 610 via a power management system, so that functions such as charge and discharge management and power consumption management are implemented via the power management system.

In addition, the terminal device 600 includes some functional modules that are not illustrated. Details are not described herein.

Optionally, an embodiment of this disclosure further provides a terminal device, including a processor 610, a memory 609, and a computer program stored in the memory 609 and capable of being run on the processor 610. When the computer program is executed by the processor 610, the processes in the foregoing embodiments of the control method are implemented, with the same technical effect achieved. To avoid repetition, details are not described herein again.

An embodiment of this disclosure further provides a computer-readable storage medium, where the computer-readable storage medium stores a computer program, and when the computer program is executed by a processor, the processes in the foregoing embodiments of the control method are implemented, with the same technical effects. To avoid repetition, details are not described herein again. The computer-readable storage medium is, for example, a read-only memory (ROM), a random access memory (RAM), a magnetic disk, or an optical disc.

It should be noted that, in this specification, the terms "include", "comprise", and any of their variants are intended to cover a non-exclusive inclusion, such that a process, method, article, or apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes that element.

According to the description of the foregoing implementations, a person skilled in the art can clearly understand that the method in the foregoing embodiments may be implemented by software on a necessary universal hardware platform or by hardware only. In most cases, the former is a more preferred implementation. Based on such an understanding, the technical solutions of this disclosure essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

The embodiments of this disclosure have been described above with reference to the accompanying drawings, but this disclosure is not limited to the foregoing specific implementations. These implementations are only illustrative rather than restrictive. Inspired by this disclosure, a person of ordinary skill in the art can still derive many variations without departing from the essence of this disclosure and the protection scope of the claims. All such variations shall fall within the protection of this disclosure.

What is claimed is:

1. A charging control circuit, wherein the charging control circuit comprises a first charging sub-circuit and a second charging sub-circuit, a charging efficiency of the first charging sub-circuit being higher than a charging efficiency of the second charging sub-circuit, and the charging control circuit further comprises a switch circuit, wherein
   a first contact of the switch circuit is connected to a charging port, a second contact of the switch circuit is connected to an output terminal of a wireless charging module, and a third contact of the switch circuit is connected to an input terminal of the first charging sub-circuit; and
   in a case of a wireless charging operation, the first contact and the third contact disconnect from each other and the second contact and the third contact conductively connect to each other.

2. The charging control circuit according to claim 1, wherein the switch circuit further comprises a first sub-circuit and a second sub-circuit;
   a first terminal of the first sub-circuit is connected to the first contact, and a second terminal of the first sub-circuit is connected to the third contact;
   a first terminal of the second sub-circuit is connected to the second contact, and a second terminal of the second sub-circuit is connected to the third contact; and in the case of a wireless charging operation, the first sub-circuit is disconnected and the second sub-circuit is conductive.

3. The charging control circuit according to claim 2, wherein the first sub-circuit comprises a first NMOS transistor, a second NMOS transistor, a first diode, and a second diode;
a drain of the first NMOS transistor is connected to the first contact, and a source of the first NMOS transistor is connected to a source of the second NMOS transistor;
a drain of the second NMOS transistor is connected to the third contact;
an anode of the first diode is connected to the source of the first NMOS transistor, and a cathode of the first diode is connected to the drain of the first NMOS transistor;
an anode of the second diode is connected to the source of the second NMOS transistor, and a cathode of the second diode is connected to the drain of the second NMOS transistor; and
a gate of the first NMOS transistor and a gate of the second NMOS transistor are both connected to a first control terminal.

4. The charging control circuit according to claim 2, wherein the second sub-circuit comprises a third NMOS transistor, a fourth NMOS transistor, a third diode, and a fourth diode;
a drain of the third NMOS transistor is connected to the second contact, and a source of the third NMOS transistor is connected to a source of the fourth NMOS transistor;
a drain of the fourth NMOS transistor is connected to the third contact;
an anode of the third diode is connected to the source of the third NMOS transistor, and a cathode of the third diode is connected to the drain of the third NMOS transistor;
an anode of the fourth diode is connected to the source of the fourth NMOS transistor, and a cathode of the fourth diode is connected to the drain of the fourth NMOS transistor; and
a gate of the third NMOS transistor and a gate of the fourth NMOS transistor are both connected to a second control terminal.

5. A terminal device, comprising the charging control circuit according to claim 1.

6. A control method, applied to the terminal device according to claim 5, wherein the method comprises:
controlling, in a case of a wireless charging operation, the first contact and third contact of the switch circuit to disconnect from each other and the second contact and third contact of the switch circuit to conductively connect to each other.

7. The method according to claim 6, wherein the controlling the first contact and third contact of the switch circuit to disconnect from each other and the second contact and third contact of the switch circuit to conductively connect to each other comprises:
in a case that a battery voltage is higher than a predetermined threshold voltage or that a battery temperature is lower than a predetermined threshold temperature, controlling the first contact and third contact of the switch circuit to disconnect from each other and the second contact and third contact of the switch circuit to conductively connect to each other.

8. The method according to claim 7, wherein the method further comprises:

in a case that the battery voltage is lower than or equal to the predetermined threshold voltage and that the battery temperature is higher than or equal to the predetermined threshold temperature, performing wireless charging by using the second charging sub-circuit.

9. The method according to claim 6, wherein before the controlling, in a case of a wireless charging operation, the first contact and third contact of the switch circuit to disconnect from each other and the second contact and third contact of the switch circuit to conductively connect to each other, the method further comprises:
sending a high-voltage charging request to a charger; and
the controlling, in a case of a wireless charging operation, the first contact and third contact of the switch circuit to disconnect from each other and the second contact and third contact of the switch circuit to conductively connect to each other comprises:
in a case of a wireless charging operation and successful request, controlling the first contact and third contact of the switch circuit to disconnect from each other and the second contact and third contact of the switch circuit to conductively connect to each other.

10. The method according to claim 9, wherein after the sending a high-voltage charging request to a charger, the method further comprises:
in a case of a wireless charging operation and unsuccessful request, performing wireless charging by using the second charging sub-circuit.

11. The method according to claim 6, wherein after the controlling, in a case of a wireless charging operation, the first contact and third contact of the switch circuit to disconnect from each other and the second contact and third contact of the switch circuit to conductively connect to each other, the method further comprises:
in a case that a wired charger is connected, controlling the first contact and third contact of the switch circuit to conductively connect to each other and the second contact and third contact of the switch circuit to disconnect from each other.

12. A terminal device, comprising a processor, a memory, and a computer program stored in the memory and capable of being run on the processor, wherein when the computer program is executed by the processor, the control method according to claim 6 is implemented.

13. A computer-readable storage medium, wherein the computer-readable storage medium stores a computer program, and when the computer program is executed by a processor, the control method according to claim 6 is implemented.

14. A terminal device, comprising the charging control circuit according to claim 2.

15. A terminal device, comprising the charging control circuit according to claim 3.

16. A terminal device, comprising the charging control circuit according to claim 4.

17. A terminal device, comprising a processor, a memory, and a computer program stored in the memory and capable of being run on the processor, wherein when the computer program is executed by the processor, the control method according to claim 7 is implemented.

18. A terminal device, comprising a processor, a memory, and a computer program stored in the memory and capable of being run on the processor, wherein when the computer program is executed by the processor, the control method according to claim 8 is implemented.

19. A terminal device, comprising a processor, a memory, and a computer program stored in the memory and capable of being run on the processor, wherein when the computer program is executed by the processor, the control method according to claim 9 is implemented.

20. A terminal device, comprising a processor, a memory, and a computer program stored in the memory and capable of being run on the processor, wherein when the computer program is executed by the processor, the control method according to claim 10 is implemented.

\* \* \* \* \*